US009874447B2

(12) United States Patent
Phuyal et al.

(10) Patent No.: US 9,874,447 B2
(45) Date of Patent: Jan. 23, 2018

(54) TURN LANE CONFIGURATION

(71) Applicant: HERE Global B.V., Veldhoven (NL)

(72) Inventors: Bishnu Phuyal, Mt. Prospect, IL (US); Bo Xu, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 55 days.

(21) Appl. No.: 14/640,666

(22) Filed: Mar. 6, 2015

(65) Prior Publication Data

US 2016/0258764 A1  Sep. 8, 2016

(51) Int. Cl.
| | | |
|---|---|---|
| *G01C 21/00* | (2006.01) | |
| *G01C 21/26* | (2006.01) | |
| *G01C 21/32* | (2006.01) | |
| *G01C 21/36* | (2006.01) | |
| *G09B 29/00* | (2006.01) | |
| *G09B 29/10* | (2006.01) | |

(52) U.S. Cl.
CPC ............ *G01C 21/26* (2013.01); *G01C 21/32* (2013.01); *G01C 21/3658* (2013.01); *G09B 29/007* (2013.01); *G09B 29/10* (2013.01)

(58) Field of Classification Search
None
See application file for complete search history.

(56) References Cited

U.S. PATENT DOCUMENTS

| | | | | |
|---|---|---|---|---|
| 8,855,904 B1 * | 10/2014 | Templeton | ........... | G08G 1/0112 340/988 |
| 8,892,356 B1 | 11/2014 | Weiland et al. | | |
| 2013/0060465 A1 | 3/2013 | Smartt | | |

FOREIGN PATENT DOCUMENTS

| | | |
|---|---|---|
| EP | 1435036 B8 | 3/2010 |
| EP | 2308035 A4 | 10/2011 |
| EP | 2333484 B1 | 4/2014 |
| WO | WO2010147730 A1 | 12/2010 |

OTHER PUBLICATIONS

Schroedl et al., "Mining GPS Traces for Map Refinement", 2004.*
Karl Wunderlich, et al., Vehicle-infrastructure Intxegration (vii) Probe Data Characteristics: Analyses of Three Field Data Sets, Jun. 2007, pp. 1-43.
Leon Stenneth, Philip S. Yu, Monitoring and Mining GPS Traces in Transit Space, pp. 1-10, 2013.
European Search Report for related European Application No. 16158259.8 dated Jul. 18, 2016.
Lili Cao et al, "From GPS traces to a routable road map" Proceedings of the 17th ACM Sigspatial International Conference on Advances in GIS '09. ISBN: 978-1-60558-649-6 (Jan. 1, 2009) p. 3.
Stefan Schroedl et al "Mining GPS Traces for Map Refinement". Data Mining and Knowledge Discovery, vol. 9 No. 1, pp. 59-87, Jul. 1, 2004.

* cited by examiner

*Primary Examiner* — Lail Kleinman
(74) *Attorney, Agent, or Firm* — Lempia Summerfield Katz LLC

(57) ABSTRACT

Systems, methods, and apparatuses are described for determining turn lane data from probe data. Probe data for an intersection including locations and headings is identified. The probe data for the intersection is divided into a first trace and a second trace based on locations. The difference in the headings, heading change data, is calculated. From the heading change data, at least two local extrema points are identified. A characteristic of the turning lane is determined based on the at least two local extrema points.

22 Claims, 16 Drawing Sheets

Shoulder to Shoulder Distance

Shoulder to Shoulder Distance

TURN LANE CONFIGURATION

FIELD

The following disclosure relates to turn lane configuration, or more particularly, to the identification of the presence or absence of a turning lane, a starting location of a turn lane, or a quantity of turn lanes from probe data.

BACKGROUND

A geographic database or a road database may include information about towns, cities, addresses, and the road network that connects the locations. The road network may be defined by road links assigned to geographic locations. Other information about the roads may also be stored such turn restrictions, speed limits, stop sign locations, and traffic signal locations.

Some techniques for collecting information on roads involves manually entering the data into a computer. For example, the existence of turning lanes may be observed by observing videos of traffic. That is, a human technician may watch videos of vehicles traveling roads and marking the observed turn lanes on a map. Alternatively, a human technician may log the turn lanes while collecting map data in a vehicle. That is, during data collection, turn lanes observed in real life are marked on a map. Both of these processes is labor intensive, time consuming, and expensive. Challenges remain in automatic and efficient techniques for automating turn lane identification and coding.

SUMMARY

In one embodiment, systems, methods, and apparatuses are described for determining turn lane data from probe data. Probe data for an intersection including locations and headings is identified. The probe data for the intersection is divided into a first trace and a second trace based on locations. The difference in the headings, heading change data, is calculated. From the heading change data, at least two local extrema points are identified. A characteristic of the turning lane is determined based on the at least two local extrema points.

In one embodiment, probe data including location values and heading values is identified for an intersection. Heading change data is calculated based on heading values in the probe data, and at least two local maxima of the heading change data are calculated. A characteristic of the turn lane is determined based on the at least two local maxima.

In one embodiment, probe data for an intersection is identified and divided into at least one turn trace and at least one through trace based on the locations in the probe data. Heading change data is calculated as a difference between the headings of the turn trace and the headings of the through trace. At least two local maxima of the heading change data are identified. From the local maxima, a number of turning lanes for the intersection is determined.

BRIEF DESCRIPTION OF THE DRAWINGS

Exemplary embodiments are described herein with reference to the following drawings.

DETAILED DESCRIPTION

The term turn lane data (TLD) or turn lane designation (TLD) refers to a collection of data describing turn lanes for a road network. A turn lane is a lane, or a particular portion of a road, that is designated to make a turn. The turn lane may extend from one road on the road network to another road on the road network. The turn lane may be a dedicated lane that allows vehicles to make a turn without disrupting traffic flow. A turn lane may be a left or right turn lane. The collection of data describing a turn lane may include the location of the turn lane, the entry point of the turn lane, and the exit point of the turn. The collection of data describing turn lanes may include a quantity of turn lanes.

The following embodiments automatically determine the TLD values by finding traces for turns and for through traffic from archived probe data. The determination is achieved by examining the heading change of the turn traces with respect to the through traces. This technique improves the speed of the coding process of defining the TLD, and this technique is also more reliable.

A geographic database or map database may be updated based on the TLD. The TLD may be utilized in routing and advising a driver when to enter a turn lane. The TLD may be used in autonomous or assisted driving in steering a vehicle in a turn lane.

Figure 1:
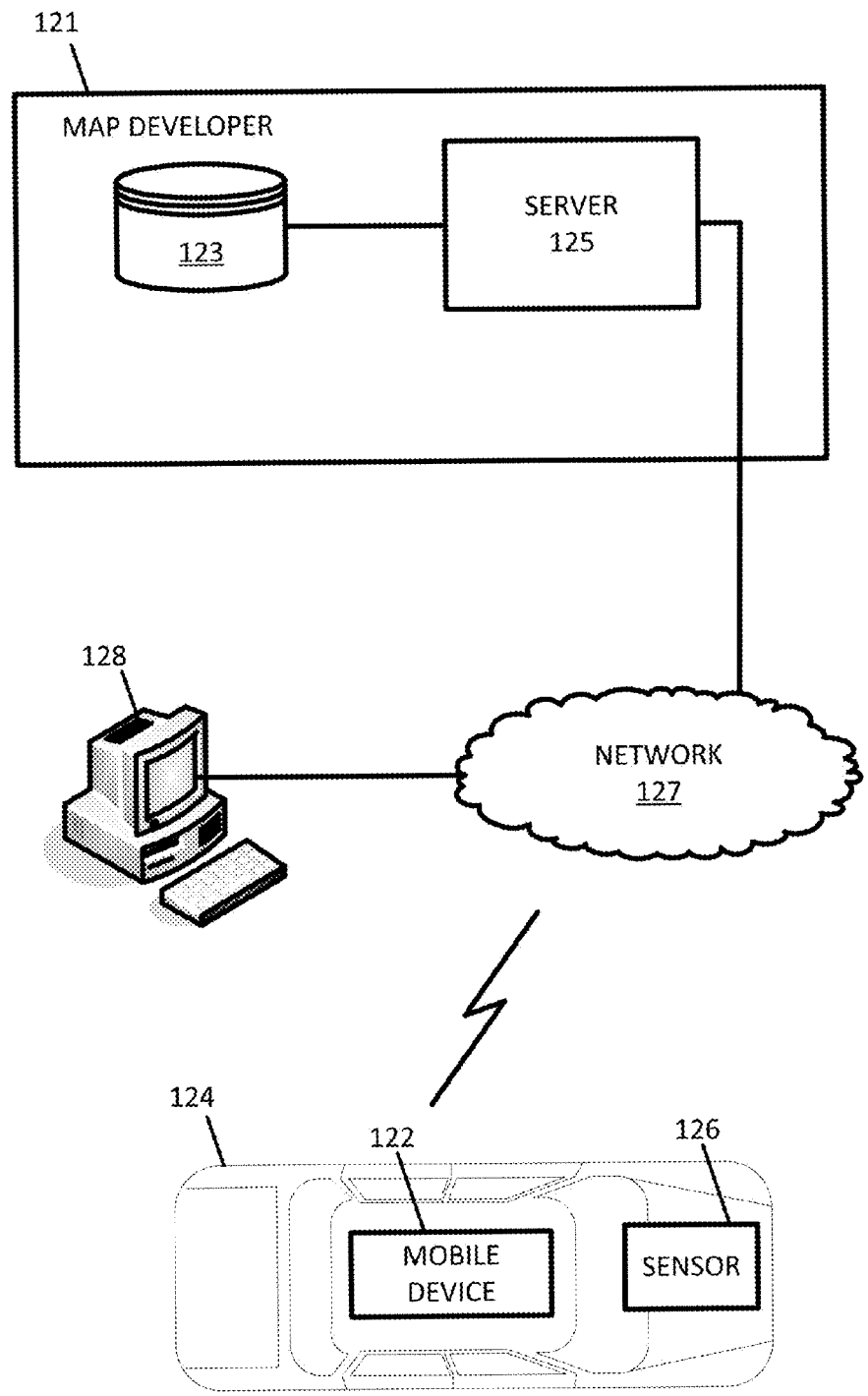
FIG. 1 illustrates an example system for identifying turn lanes.

FIG. 1 illustrates an example system 120 for identifying turn lanes. The system 120 includes a developer system 121, one or more mobile devices 122, a workstation 128, and a network 127. Additional, different, or fewer components may be provided. For example, many mobile devices 122 and/or workstations 128 connect with the network 127. The developer system 121 includes a server 125 and one or more databases. The database 123 may be a geographic database including road links or segments.

The mobile device 122 may be considered a probe. The mobile device 122 may receive sensor data or probe data related to the operation of vehicle 124 from the sensor 126, which is shown external to the mobile device 122 but may also be integrated with the mobile device 122. In one example, the sensor data or probe data includes location data (e.g., geographic coordinates) from a global positioning system (GPS). The location data may be analyzed to determine the speed, acceleration, or change in acceleration of the vehicle 124. The sensor 126 may include an inertial sensor, a position sensor, a magnetic sensor or another sensor.

In one example, the probe data is analyzed to determine heading data. For example, the server 125 or the mobile device 122 calculates an angle between two consecutive probe points. For example, between probe point (X1, Y1) and probe point (X2, Y2), an angle for the heading may be the arctangent of (X2−X1)/(Y2−Y1) or the arctangent of (Y2−Y1)/(X2−X1). In another example, the probe data includes measured heading values, for example, from a magnetic sensor or an inertial sensor. The heading may be a quantity of degrees measured from an axis such as the horizontal axis or x-axis or the vertical axis or y-axis. Thus, the probe data may include location values paired with heading values.

Figure 2:
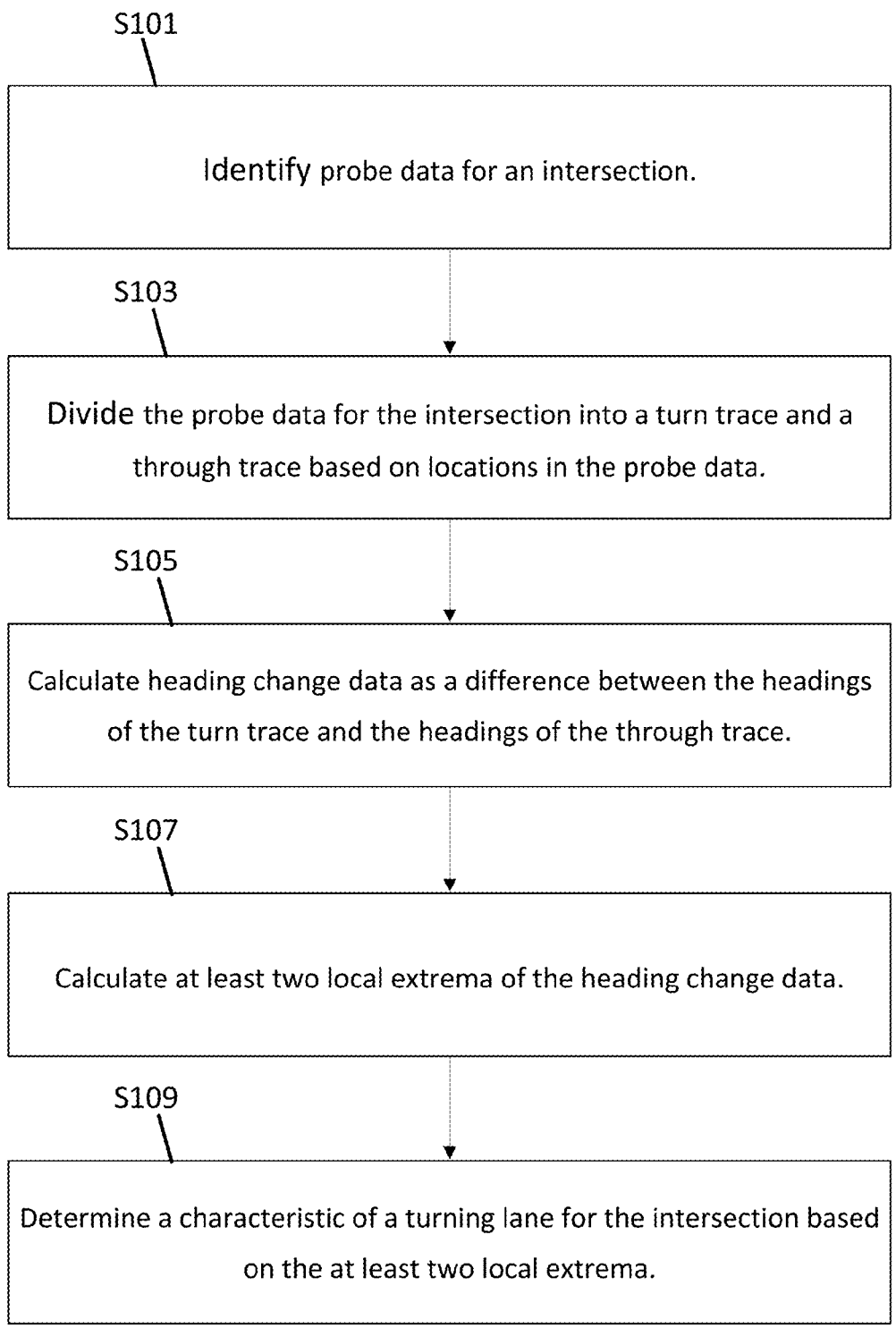
FIG. 2 illustrates a flowchart for identifying a turn lane.

FIG. 2 illustrates a flowchart for identifying a turn lane. Additional, different, or fewer acts may be included. At act S101, the server 125 or the mobile device 122 may identify probe data for an intersection. For example, a geographic location or an intersection location is used to select a set of probe data. The intersection may be defined by four coordinate points, forming a quadrilateral. The intersection may be defined by the intersection of two or more road segments, which may be identified by road segment identifier values.

At act S103, the server 125 or the mobile device 122 may be configured to divide the probe data for the intersection into at least one first type of trace (e.g., turn trace) and at least one second type of trace (e.g., through trace) based on the locations in the probe data. The probe data may be divided into sets of probe points collected by the probe (e.g., mobile device 122) as the vehicle traverses the intersection. The probe data may be categorized or divided based on whether the vehicle is on the same road segment after the intersection as before the intersection. The term downstream may refer to after the intersection in the direction of movement of the vehicle. The term upstream may refer to before the intersection in the direction of movement of the vehicle. When the vehicle stays on the same road segment, the set of probe data is designated as a through trace. When the vehicle turns onto another road segment, the set of probe data is designated as a turn trace.

At act S105, the server 125 or the mobile device 122 calculates heading change data as a difference between the headings of the turn trace and the headings of the through trace. Consider an example in which the turn trace includes a sequence of headings [A1, A2, A3, A4] and the through trace includes a sequence of headings [B1, B2, B3, B4]. Thus, the heading values are matched by sequence in an array. The heading change data is calculated as [A1−B1, A2−B2, A3−B3, A4−B4]. Alternatively, the mobile device 122 or the server 125 may match points in the turn trace to corresponding points in the through trace based on location. For example, points in the turn trace are matched with points in the through trace that are closest together in the direction of travel of the road segment.

Alternatively, the intersection may be a T-shaped intersection. In a T-shaped intersection all of the lanes are turning lanes. There are no through lanes or through traces. In this example, act S103 may be omitted, and the server 125 or mobile device 122 is configured to identify the turn trace. Further, in act S105, the server 125 or the mobile device 122 may identify link geometry for the intersection. The link geometry includes locations for the road segment or a lane of the road segment. Headings for the link geometry are calculated in the same manner that heading values are calculated from the probe data. The heading change data is calculated as a difference between the heading values in the probe data and heading values derived from the link geometry.

At act S107, the server 125 or the mobile device 122 calculates at least two local extrema of the heading change data. The local extrema may be local maxima, local minima, or a combination of at least one maximum and at least one minimum. The local extrema may be located by comparing adjacent heading change values. When a point is larger than a preceding point and a subsequent point, the point is designated as a local maximum. When a point is smaller than a preceding point and a subsequent point, the point is designated as a local minimum. In other examples, a derivative of the heading change data is calculated, and when the derivative equals zero or within a predetermine range to zero, the point is considered a local extrema. Nearby points may be analyzed to distinguish between minima and maxima.

At act S109, the server 125 or the mobile device 122 determines a characteristic of a turn lane for the intersection based on the at least two local extrema. The characteristic may be a number of turn lanes or locations of the turn lanes. In one example, the local maxima may be plotted against a statistical parameter. The statistical parameter may be a standard deviation, a variance, or a moving average of the heading change values or other the original heading values. The plot may be segmented to identify regions that correspond to different quantities of turn lanes. In another example, the local maxima may be classified by a machine learning algorithm. The machine learning algorithm may be Bayesian, vector classification, neural network, fuzzy network, or other techniques.

The mobile device 122 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the mobile device 122. In some embodiments, the server 125 performs a majority of the processing for calculating the vehicle confidence value and the comparison with the confidence threshold. In other embodiments, the mobile device 122 or the workstation 128 performs a majority of the processing. In addition, the processing is divided substantially evenly between the server 125 and the mobile device 122 or workstation 128.

The communication between the mobile device 122 and the server 125 through the network 127 may be radio or wireless communication such as cellular, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

Figure 3:
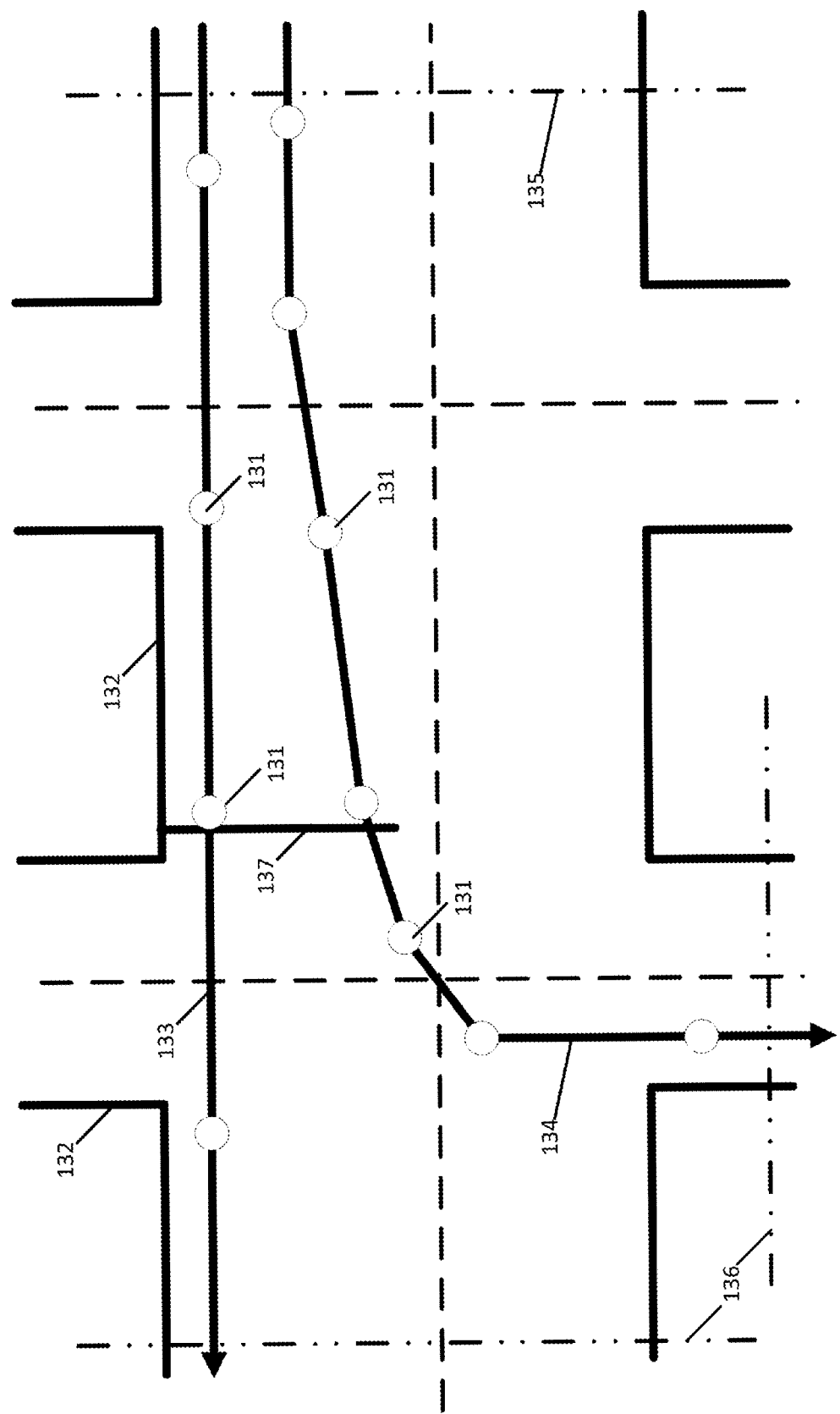
FIG. 3 illustrates an example intersection.

FIG. 3 illustrates an example intersection with probe points 131, sidewalks or medians 132, a through trace 133, a turn trace 134, a start line 135, and a stop line 137. Additional or different features may be included.

The probe point 131 may be defined as a set of data that minimally includes latitude, longitude, and a probe identification number for a vehicle. The probe identification number may include an identification value for the vehicle acting as the probe and collecting the probe data and may include an identification value for an individual point. The probe point 131 may also include heading, a timestamp, and speed. The heading and speed may be measured or calculated from the latitude and longitude values.

The aggregate probe data may include sets of probe points collected from multiple vehicles for a period of time. The probe points may be collected by an application running on the mobile device 122. For example, the probe points may be collected by mobile phone without intervention by the user. The mobile application may be mapping or routing application or a traffic application. The period of time may be any period of time such as a day, week, month, years, or longer time periods. The period of time may be defined by the volume of data. For example, the aggregate probe data for an intersection may include a predetermined number of probe points (e.g., 100, 1000, 10000 or another value).

A trace may be a set of probe points in the order of time. That is, as the probe travels through the intersection, the probe collects a sequence of probe points ordered in time. An example trace may be (x1, y1, h1, . . . , t1), (x2, y2, h2, . . . t2), . . . for one vehicle. (x, y, h, . . . t) are latitude, longitude, heading, . . . , and time respectively.

A turn trace 134 may be a trace that starts near the upstream side of the intersection or upstream of the intersection and ends near the downstream side of the intersection or downstream of the intersection after making a turn. Thus, a turn trace 134 is generated when the vehicle collecting the trace enters the intersection and makes a turn. The turn trace 134 may be defined as a traversal in which the vehicle changes road segment in the intersection.

A through trace 133 may be defined as a trace that starts near the upstream side of the intersection or upstream of the intersection and ends near the downstream side of the intersection or downstream of the intersection by traveling substantially straight through the intersection. Thus, a through trace 133 is generated when the vehicle collecting the trace enters the intersection and exits the intersection on the same road segment or without substantially changing direction.

A trace start line 135 may be defined as a line indicative of the start of either a turn trace or a through trace. A trace end line 136 may be defined as a line indicative of an end of either a turn trace or a through trace. A stop line 137 may be a line indicative of a location close to the intersection where a vehicle driven towards the intersection stops during red traffic signal.

Figure 4:
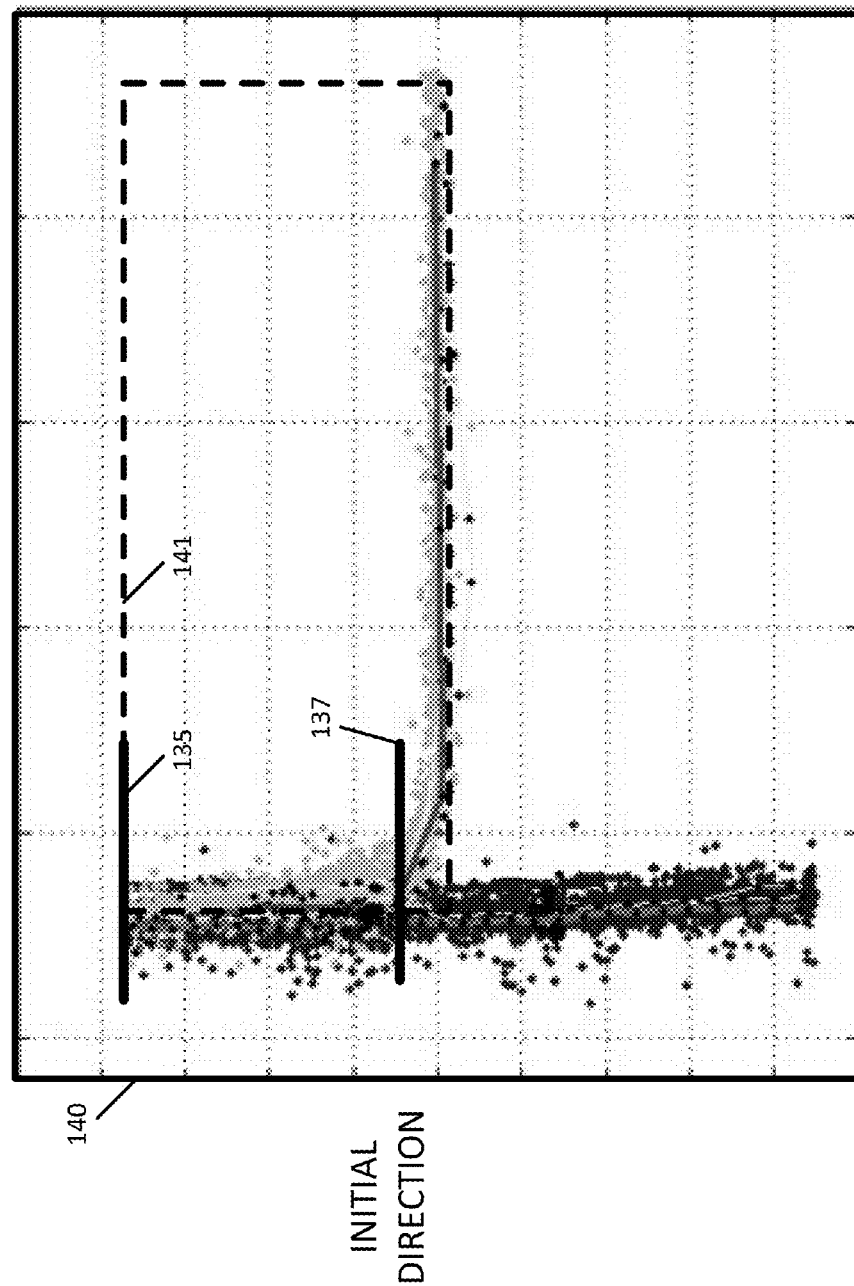
FIG. 4 illustrates an example probe data for an intersection.

FIG. 4 illustrates example probe data for traces of an intersection. A chart 140 shows the probe data. A horizontal axis or x-axis illustrates a turn direction and a vertical axis or y-axis illustrates an initial direction. Thus, the probe data in rectangle 141 are probes that traveled along the initial direction then turned onto the turn direction, which is the turn trace. The data outside of the rectangle represents probes that continuation to travel along the initial direction. In this example, the turn direction is north-east and the initial direction is north-south. Any others directions can be processed in the same way. The turn direction may be perpendicular to the initial direction, but other angles are possible.

The traces for archived probe data or historical probe data are analyzed to determine the presence or absence of turn lanes, the number of turn lanes, and the start location of turn lanes. This data may be referred to as a TLD.

Other factors lead to variances in the data. All of the positions for the probe data in the rectangle 141 were collected by vehicles traveling in the same lane. However, the variances or spatial distribution may be caused by differences in the lateral direction of different vehicles at the time of driving on the road. That is, the lane is larger than the vehicle so vehicles may choose slightly different paths. Also, GPS errors contribute to the spatial distribution. Therefore, the distribution of the probe data set spans certain buffer area on either side of the road with concentration on lane centers. Probe headings are also affected similarly.

The archived probe data are used to create traces. For each studied turn in an intersection, two sets of traces are created, one for the turn (i.e. turn traces) and the other for the through traffic (i.e. through traces). An average heading value at every unit distance (e.g. one meter) is derived for both the turn trace set and through trace set. A difference between the average headings of the two sets is computed at each unit distance. Calculating the difference in this way provides the heading change for the turn with respect to that of the through trace. In this way the heading change values are normalized. The pattern of the heading change indicates the presence or absence of turn lanes, number of turn lanes and start location of turn lanes.

Until a vehicle from a turn trace reaches the actual turn, the heading of the vehicle is similar to that of the through traffic because both traces follow the same direction. As the vehicle approaches turn lane, the heading begins to deviate from that of the through traffic. The magnitude of the deviation varies depending upon the location of the vehicle with respect to the turn lane geometry. As the vehicle approaches the stop line, the vehicle may realign with the direction of through traffic and therefore the deviation may reduce to zero or near zero. By analyzing the pattern of this normalized deviation (i.e. the heading difference between the two traces), it is possible to determine the TLD values.

As shown in FIG. 4, the archive probe data may be limited geographically and temporally. The archived probe data may be collected by mobile devices 122 over time. The mobile devices 122 may include data collection vehicles, mobile phones, or navigation devices. A subset of the archived probe data may be selected according to a period of time. For example, the last year of data or the last week of data may be used. A user input may define the amount of data needed to get reliable results. In the example of FIG. 4, two years of data are illustrated.

The archived probe data may be limited by a suitable spatial bounding rectangle around the intersection. The rectangle is selected to find all the left turn trace and through trace data for the intersection or a statistically significant portion of the archived probe data to describe the intersection.

The bounding rectangle may be defined by the start line location and the stop line location for the turn trace and the start line location and the stop line location for the through trace. In one technique, the stop line 137 may be found by using the location of lowest average speed. That is, speed is calculated or measured along the traces. The region along the trace with the lowest speed, is selected as the stop line 137. In another technique, the location of the highest density of zero speed points that lie near the intersection is selected for the stop line 137. That is, speeds of zero that indicate stopped vehicles are identified. The location with the greatest number of stopped vehicles is designated as the stop line location. The start line 135 may be set at a predetermined distance from the turn of the intersection. The predetermined distance may be 10 meters, 20 meters, or another value. The predetermined distance may be measured from the point at which the turn trace changes to the turn direction. The predetermined distance may be measured from the node indicative of the intersection of the road segments. The lateral sides of the bounding rectangle may be defined by the width of the road segment or a predetermined distance.

The archived probe data bound by the rectangle defined by the start lines and the stop lines may be clipped. The server 125 or mobile device may be configured to identify the stop line 137 and the start line 135 based on the probe data, and remove a portion of the probe data downstream of the stop line and a portion of the probe data upstream of the start line.

The mobile device 122 or the server 125 may be configured to calculate heading values from the probe data for the through trace and calculate heading values from the probe data for the turn trace. Equation 1 provides one example for calculating average heading values from a given set of heading values ($\alpha_1, \alpha_2, \ldots \alpha_n$), which may be calculated from the probe data or directly measured as part of the probe data. The number of heading values to be averaged is 'n'. The function 'a tan 2' is the arctangent function that gives angle in the range (−180 degrees≤α≤180 degrees). Alternatively, an arctangent function may be used and the result limited to a specific angle range suitable for turns in an intersection.

$$H = a\tan 2\left(\frac{\sum_{j=1}^{n} \sin \alpha_j}{n}, \frac{\sum_{j=1}^{n} \cos \alpha_j}{n}\right). \quad \text{Eq. 1}$$

The mobile device 122 or the server 125 may be configured to calculate the standard deviation of the average heading values. The standard deviation may be calculated separately for the through trace and for the turn trace. Equation 2 provides one example of calculating standard deviation $\rho_H$ based on $\Delta(\alpha_j, H)$, which is the angle between $\alpha_j$ and H.

$$\sigma_H = \sqrt{\frac{\sum_{j=1}^{n} \Delta(\alpha_j, H)}{n-1}} \quad \text{Eq. 2}$$

Figure 5:
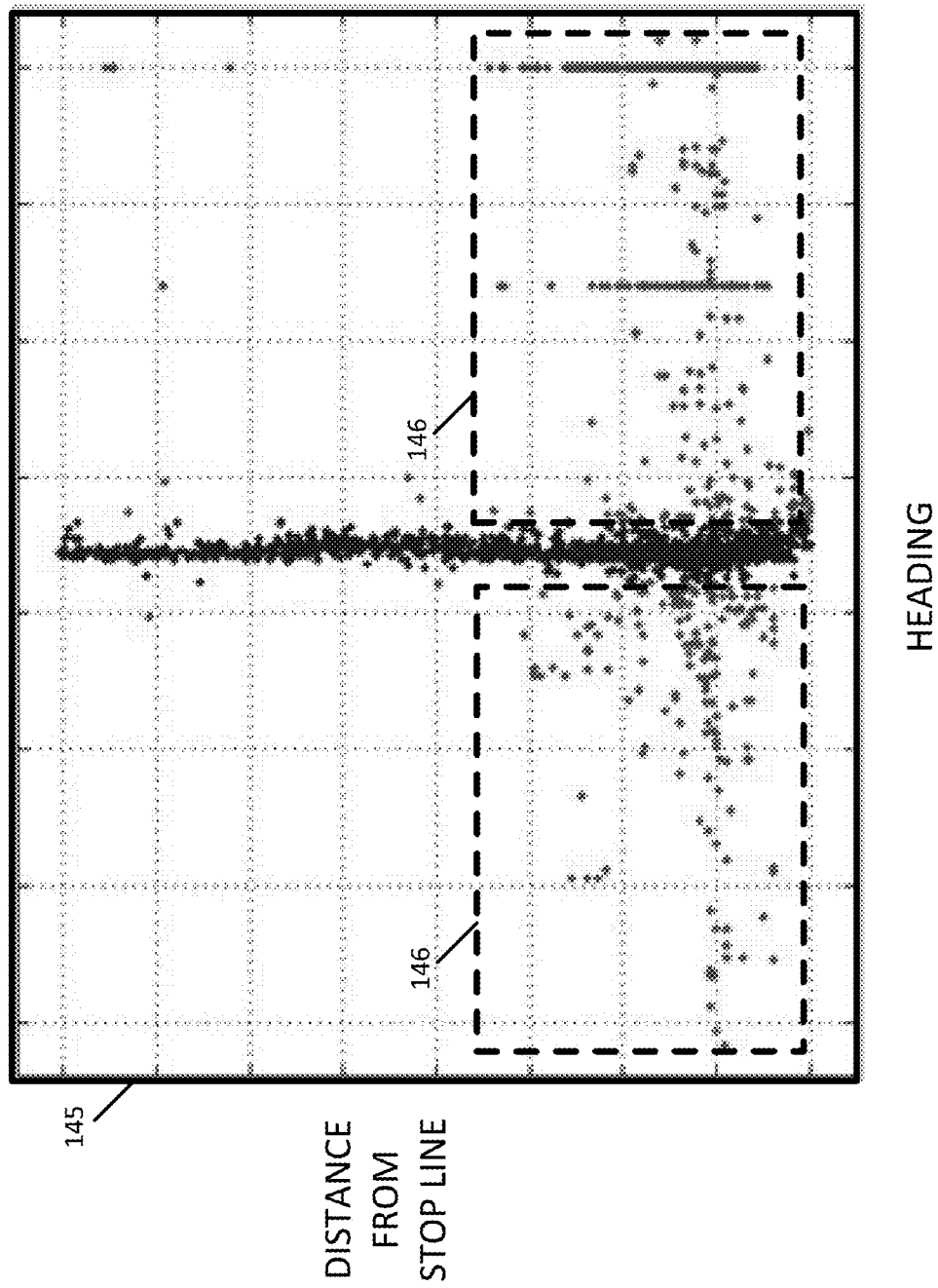
FIG. 5 illustrates an example of filtering probe data.

FIG. 5 illustrates an example of filtering probe data. The mobile device 122 or the server 125 may be configured to filter the probe data of the through trace based on the average of the heading and the standard deviation of the heading. Using the average heading and standard deviation, heading values that are far away from the average are removed (e.g., the probe data in rectangles 146 are removed). For example, values more than a predetermined number of standard deviations are removed. The predetermined number of standard deviations may be one standard deviation, two standard deviations, three standard deviations, or a fractional value in between.

In one technique, a window may be defined based on the standard deviation and the average using a certain window size, (e.g., 10, meters, 15 meters or another value) and increment a unit distance (e.g., 0.5 meters, 1 meter, or another value). The heading data for the through trace within the moving window are averaged to calculate a moving average value. The window is incremented by the unit distance and another moving average value is calculated. The process begins when the window borders the start lines and repeats until the widow borders the stop line.

The mobile device 122 or the server 125 may be configured to filter the probe data of the turn trace based on the average of the heading and the standard deviation of the heading of the turn trace. Using the average heading and standard deviation, heading values for the turn trace that are far away from the average are removed (e.g., the probe data in rectangles 146 are removed). For example, values more than a predetermined number of standard deviations are removed. The predetermined number of standard deviations may be one standard deviation, two standard deviations, three standard deviations, or a fractional value in between. The number of standard deviations for the turn trace may be greater than the number of standard deviations for the through trace.

Figure 6:
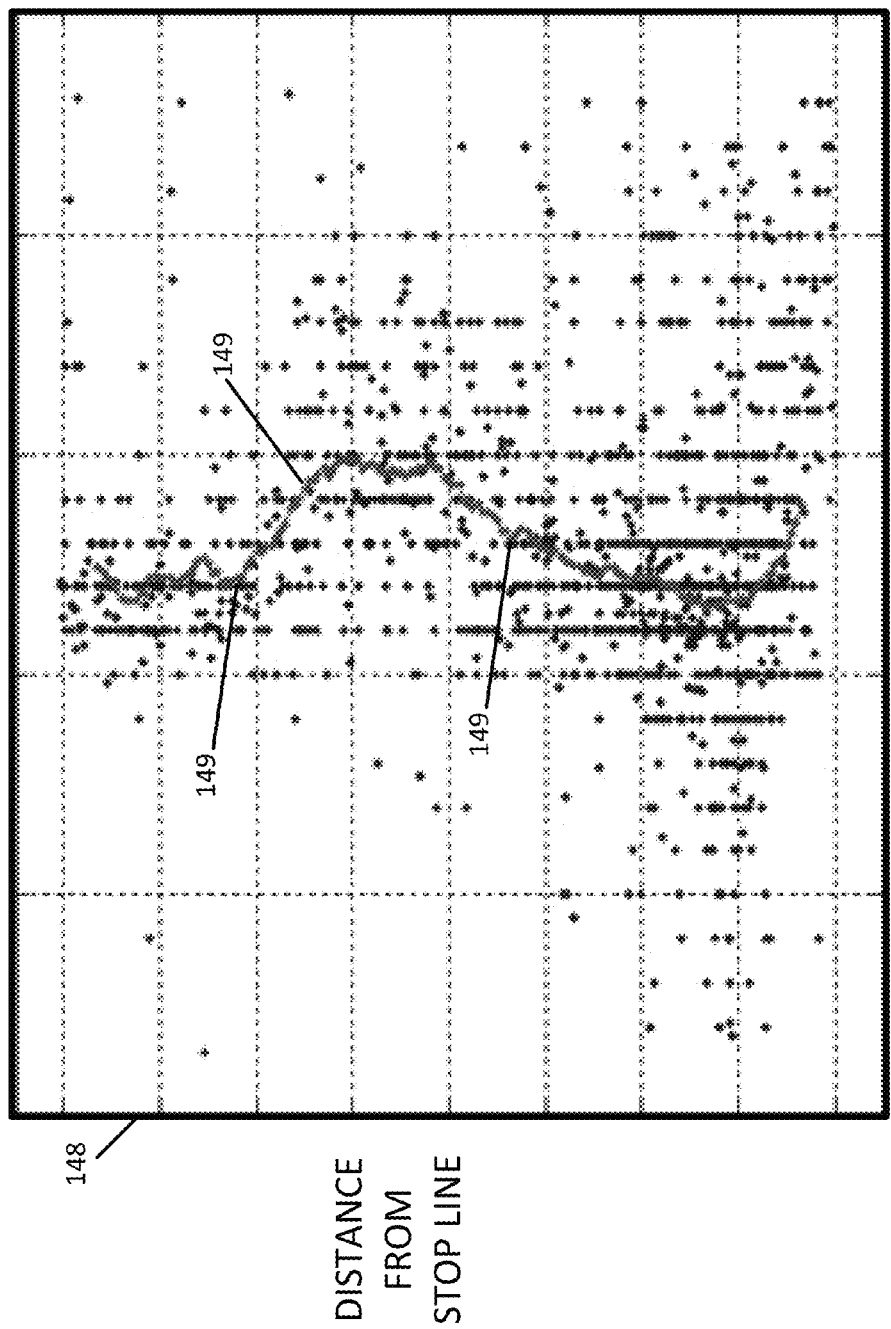
FIG. 6 illustrates an example moving average of heading change values.

In one technique, a window for the turn trace may be defined based on the standard deviation and the average. Using a certain window size, (e.g., 10, meters, 15 meters or another value) and increment a unit distance (e.g., 0.5 meters, 1 meter, or another value). The window size and increment size may be different for the turn trace than for the through trace. The heading data for the turn trace within the moving window are averaged to calculate a moving average value for the turn trace. The window is incremented by the unit distance and another moving average value is calculated. The process begins when the window borders the start lines and repeats until the widow borders the stop line. FIG. 6 illustrates an example moving average of heading change values represented by line 149.

The mobile device 122 or the server 125 may be configured to determine the difference of the turn lane moving average headings and the through lane moving average headings. This difference is the deviation of turn lane direction with respect to the through lane direction. The difference may be referred to as the heading change, which is the normalized value. Individual values in the moving average of the turn trace may be paired with individual values in the moving average of the through trace. The pairs may be matched based on geographic position.

In some examples, because the probe data has errors, calculating the average moving window values and the difference between the turn trace and through trace, there remain noises in the heading change data. Such irregularity can be seen in curve 151 of FIG. 7. In order to reduce the effects of these errors, the mobile device 122 or server 125 may smooth the heading change data with a filter. In one example, a Kalman type of filter or another type of filter is applied to the heading change data in multiple iterations. A first iteration is applied from the start to end (e.g., start line to end trace line), and a second iteration is applied from end to the start (e.g., end trace line to start line). The results from the iteration may be combined to obtain a smoother heading change curve, as shown by curve 153.

The mobile device 122 or server 125 may be configured to calculate one or more maxima and one or more minima from the heading change curve. The maxima and minima may be calculated from the heading change data or from the smoothed heading change curve. Various techniques may be used to calculate the minima and maxima. In one example, potential points are identified by calculating a derivative of the heading change data. When the derivative is zero or within a range of zero, a potential minimum or maximum is identified. The neighboring may be analyzed to distinguish between a minimum and a maximum. In another example, the heading change data is analyzed directed to identify a change in direction. When the neighboring points are larger, the point is a local minimum. When the neighboring points are smaller, the point is a local maximum.

Figure 7:
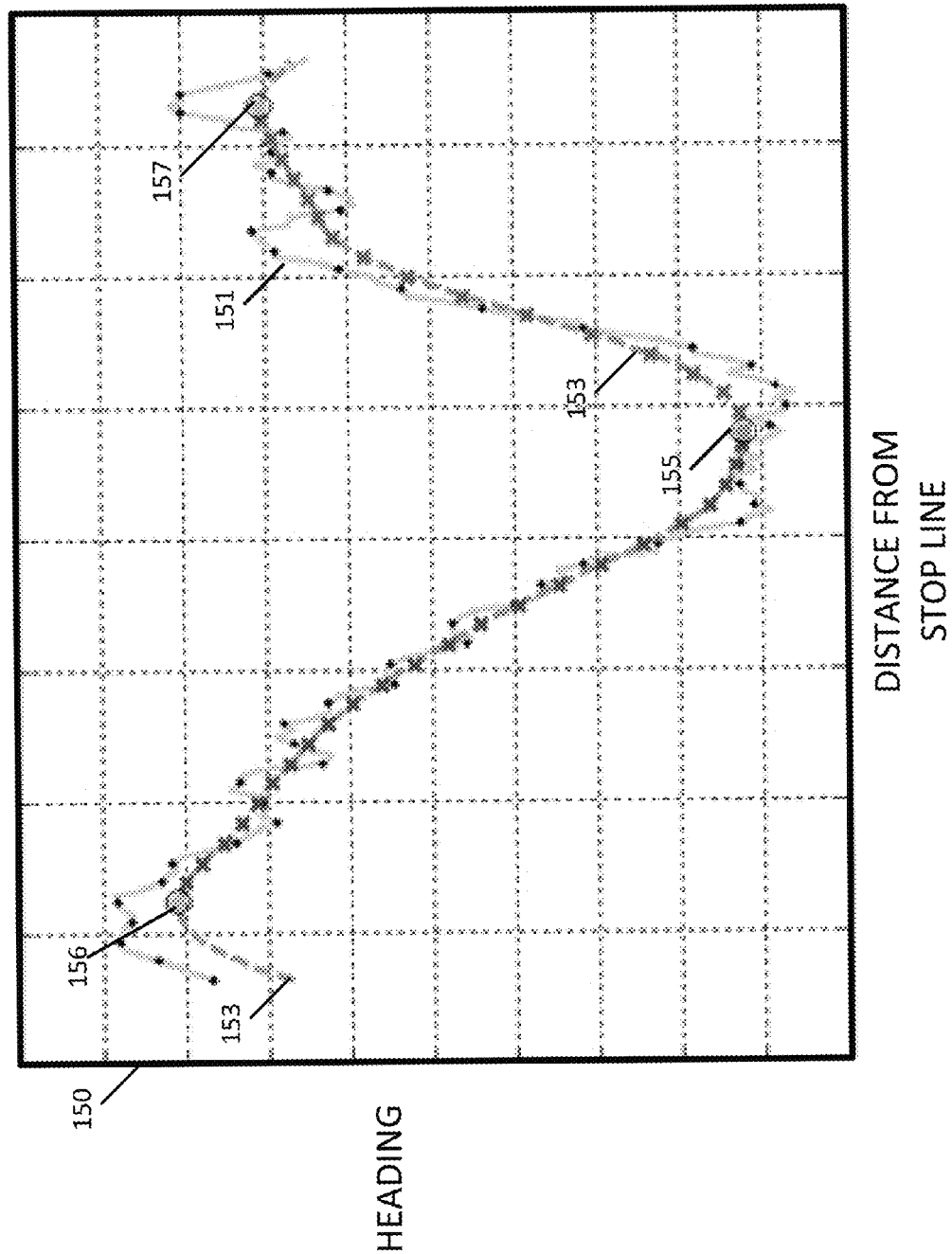
FIG. 7 illustrates example shoulder points for heading change values.

FIG. 7 illustrates example local maxima 156 and 157 and a global minimum 155 for heading change values. Among the local minima, the one with lowest value is the global minimum 155. The global minimum 155 is the approximate location where the turn lane begins. The mobile device 122 or the server 125 may store the global minimum 155 as the beginning of the turn lane in the map database.

The mobile device 122 or the server 125 may calculate distances between pairs of adjacent maxima and minima. The distance may be Euclidian distances based on the location of the points. The maxima and minima may be divided based on the global minimum. For example, the two longest distances are identified. One is the largest distance on one side of the global minimum point, and the other is the largest distance on the other side of the global minimum point.

The two local maxima points, from which the two distances are computed, may be identified as shoulder points. Shoulder point 156 is associated with the largest distance on one side of the global minimum point 155. Should point 157 is associated with the largest distance on the other side of the global minimum point 155. A shoulder point that is far from stop line is a location where vehicle begin to deviate from through traffic direction and enter the turn lane. Similarly the shoulder point close to the stop line is a location where vehicle on turn lane begins aligning with the through traffic direction. In some cases, for example for a short extent of a turn lane, there may not be one or the other shoulder point. Similarly, there may not be any local minima point when there is no turn lane.

The mobile device 122 or the server 125 may compute the standard deviation of the heading change of all the points lying between the two shoulder points. Similarly compute the distance between the two shoulder points. These two quantities and the location of global minimum point and shoulder points are related to the TLD values.

Figure 8:
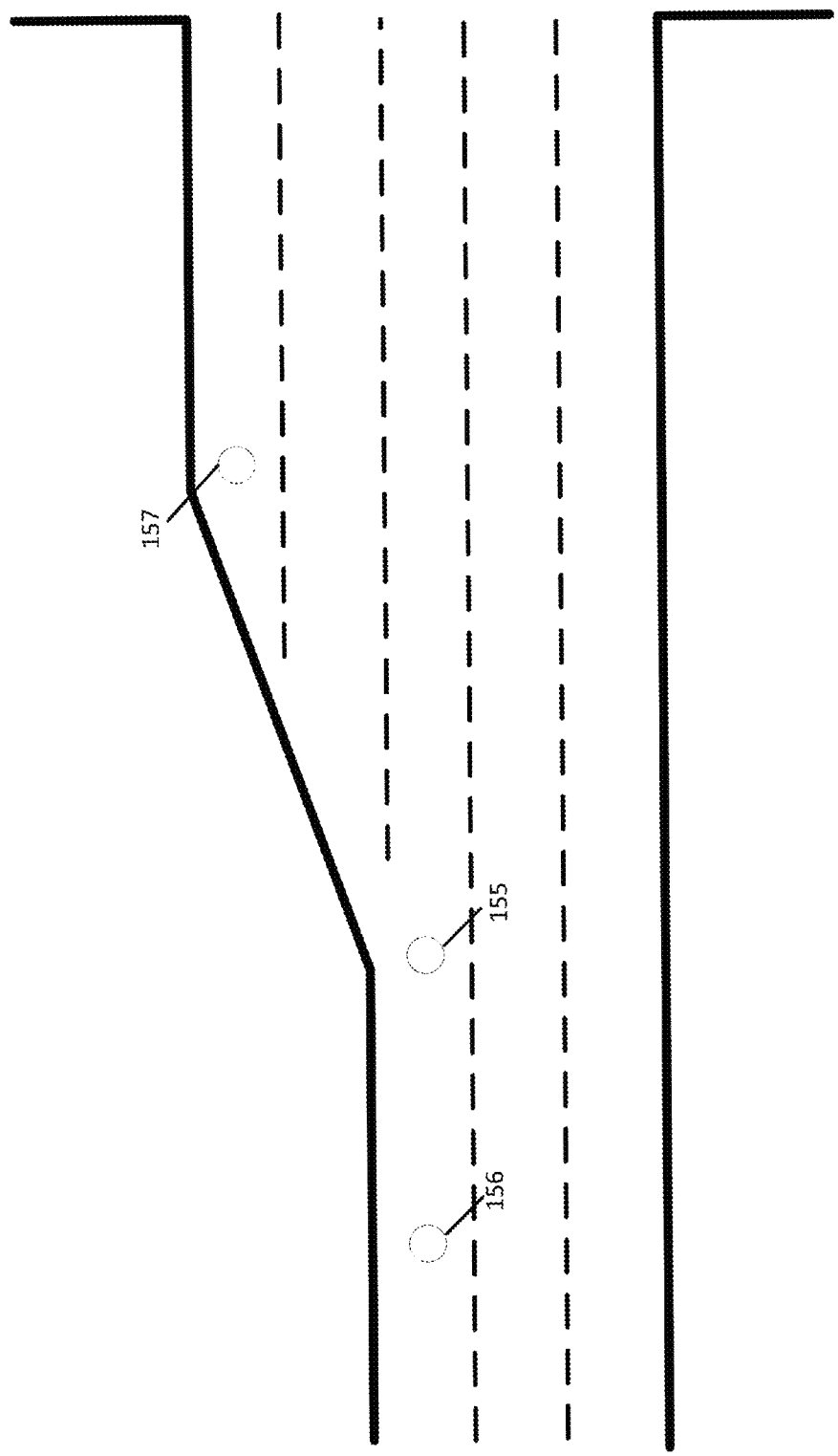
FIG. 8 illustrates an example set of turn lanes.

FIG. 8 illustrates an example set of turn lanes. The mobile device 122 or the server 125 may apply the analysis above to a map database including the set of turn lanes. For example, the global minimum 155 indicates where the turn lane begins, the first shoulder point 156 indicates the location where some turning vehicles change from through lane towards the turn lane, and the second shoulder point 157 indicate when the turning vehicle are again parallel with through traffic.

Figure 9:
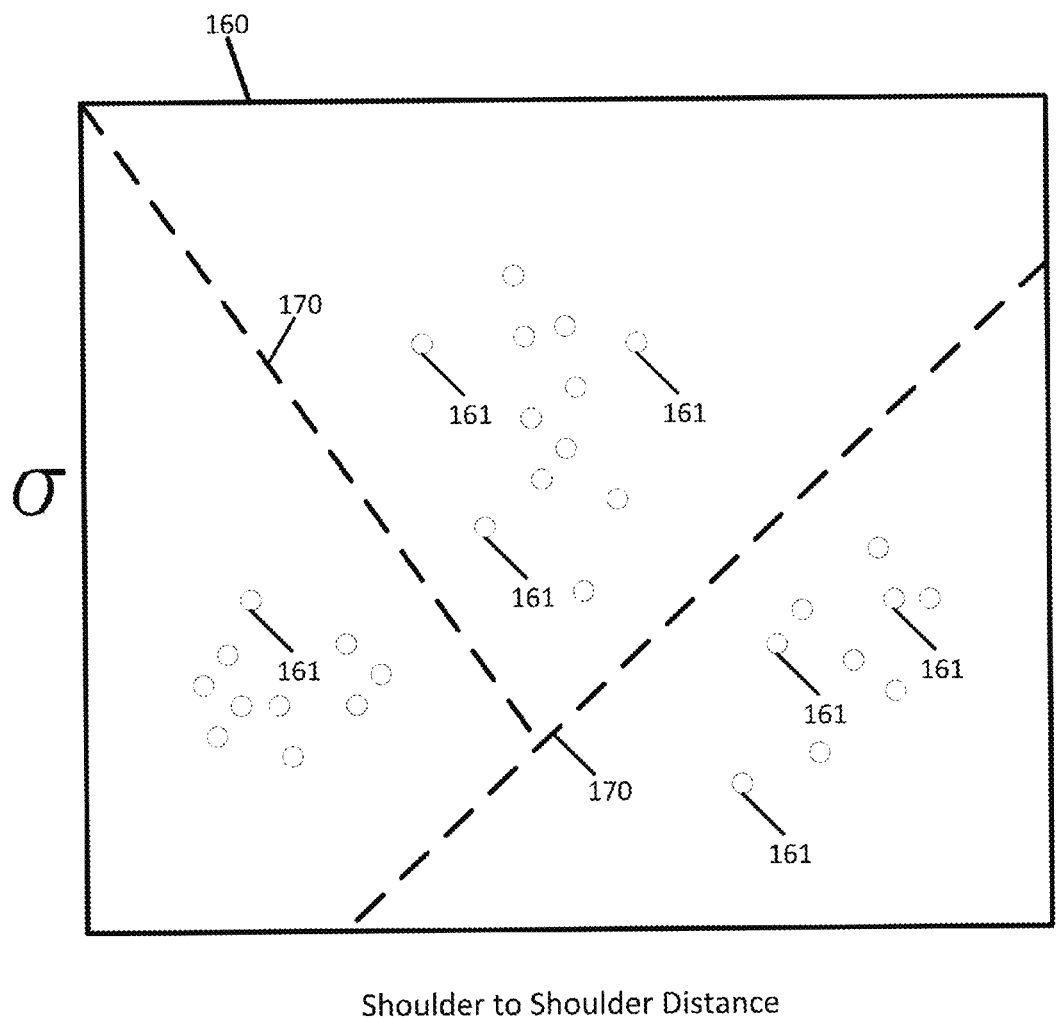
FIG. 9 illustrates an example classification of data for identifying turn lanes.

FIG. 9 illustrates an example chart 160 for the classification of data 161 for identifying turn lanes. The data 161 is the standard deviation of the heading change data plotted against the largest distance between local maxima. It has been shown that the data 161 tend to cluster based on how many turning lanes are available. The mobile device 122 or the server 125 may classify the data 161 based on one or more threshold (e.g., dividing lines 170). It is noted that the arrangement of data 161 and lines 170 are not necessarily to scale and are one illustrative example. The lines 170 divide the data 161 into three regions. One region may correspond to a single turning lane, another region may correspond to two turning lanes, and another region may correspond to three turn lanes. Thus, a region is selected based on a particular distance between maxima and standard deviation. Alternatively, one of the regions may correspond to no turn lanes.

In one example, the dividing line 170 may correspond to about the 0.4 standard deviation value. The intersections with one turn lanes may be clumped together and above the 0.4 standard deviation value and have distance between the shoulder points less than 135 meters. Therefore, it may be possible to draw a line at 0.4 standard deviation value to distinguish if an intersection has turn lane or not.

Figure 10:
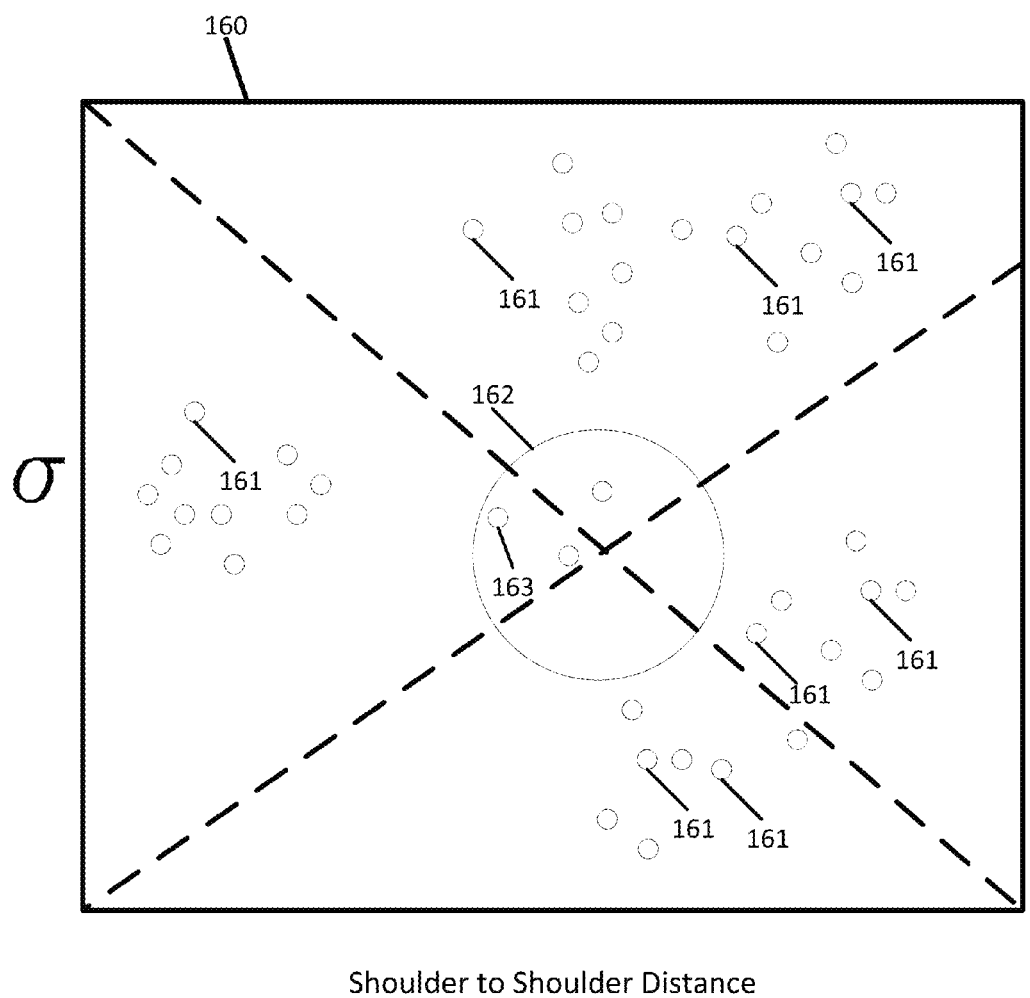
FIG. 10 illustrates another example classification of data for identifying turn lanes.

FIG. 10 illustrates another example classification of data for identifying turn lanes. In FIG. 10, four regions are used (e.g., 0, 1, 2, 3 turn lanes), and near the intersection of the regions, indicated by circle 162, some inconclusive data 163 are illustrated. When a pair of distance and standard deviation values is in the circle 162 it may be concluded that the data is inconclusive for the number of turn lanes included.

In another example, a learning algorithm may be used for the classification. The learning algorithm may be trained based on a set of known data. For example, a set of classification vectors may be derived based on a set of data for roads in which the number of turn lanes is known. The number of turn lanes, the calculated largest distance, and the calculated standard deviation for many roads is a training set of data used to define the classification vectors. The above procedure was repeated for a number of intersections with no turn lane, one turn lane and two turn lanes. The distance and the standard deviation data for those intersections were computed.

Subsequently, when new data is acquired, and the number of lanes is unknown, the mobile device 122 or the server sends the two maxima of the largest distance and a standard deviation of the heading data to the classification system. The classification system returns the number of turning lanes from the classification system.

Apart from the distance and standard deviation, it is also possible to derive other statistical quantities about the heading change values and the length of the turn, for example accumulated heading change, individual heading changes from one shoulder point to global minimum, or other values. These are additional values to infer the TLD values correctly.

Figure 11:
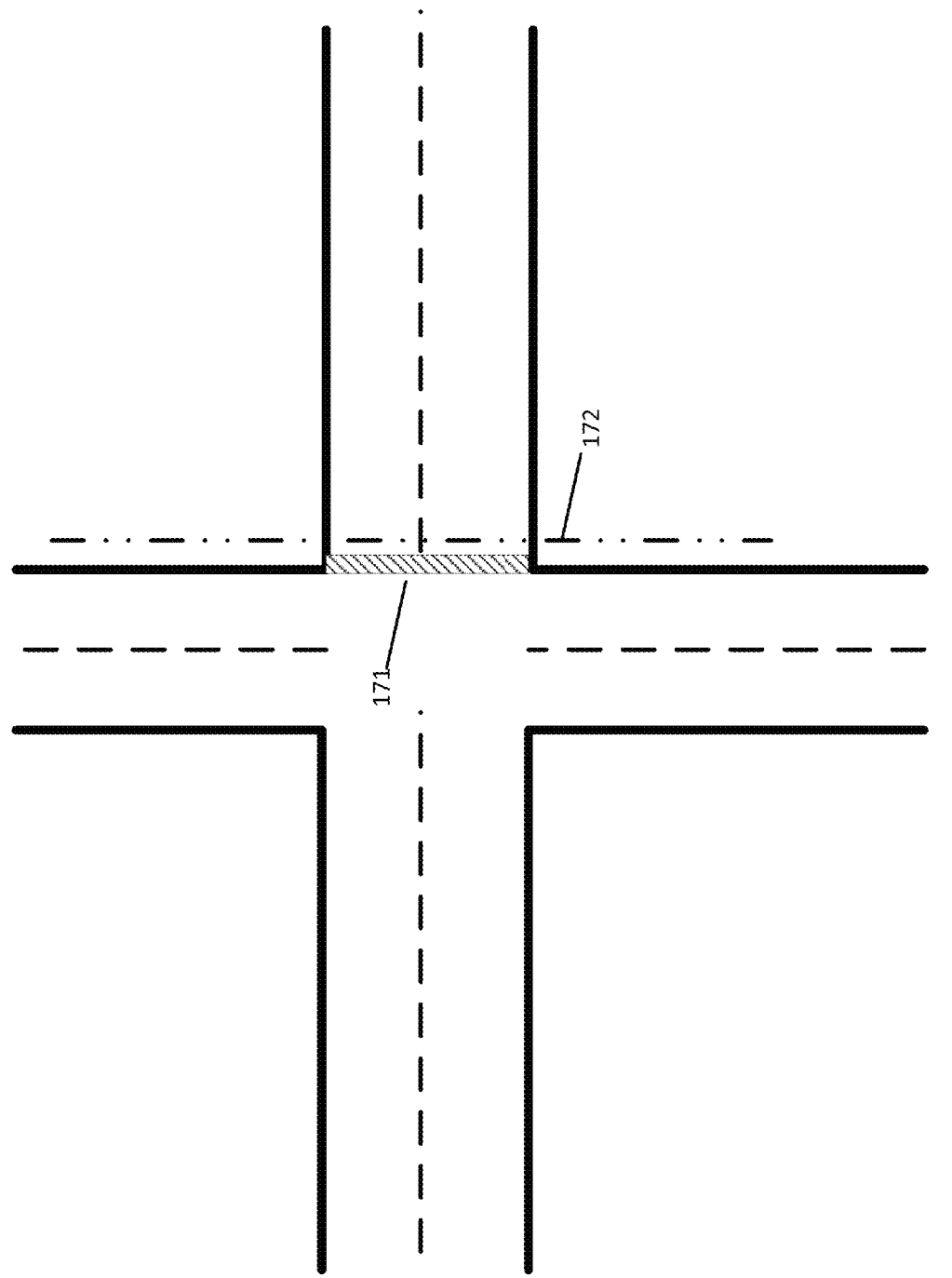
FIG. 11 illustrates an example stop line.
Figure 12:
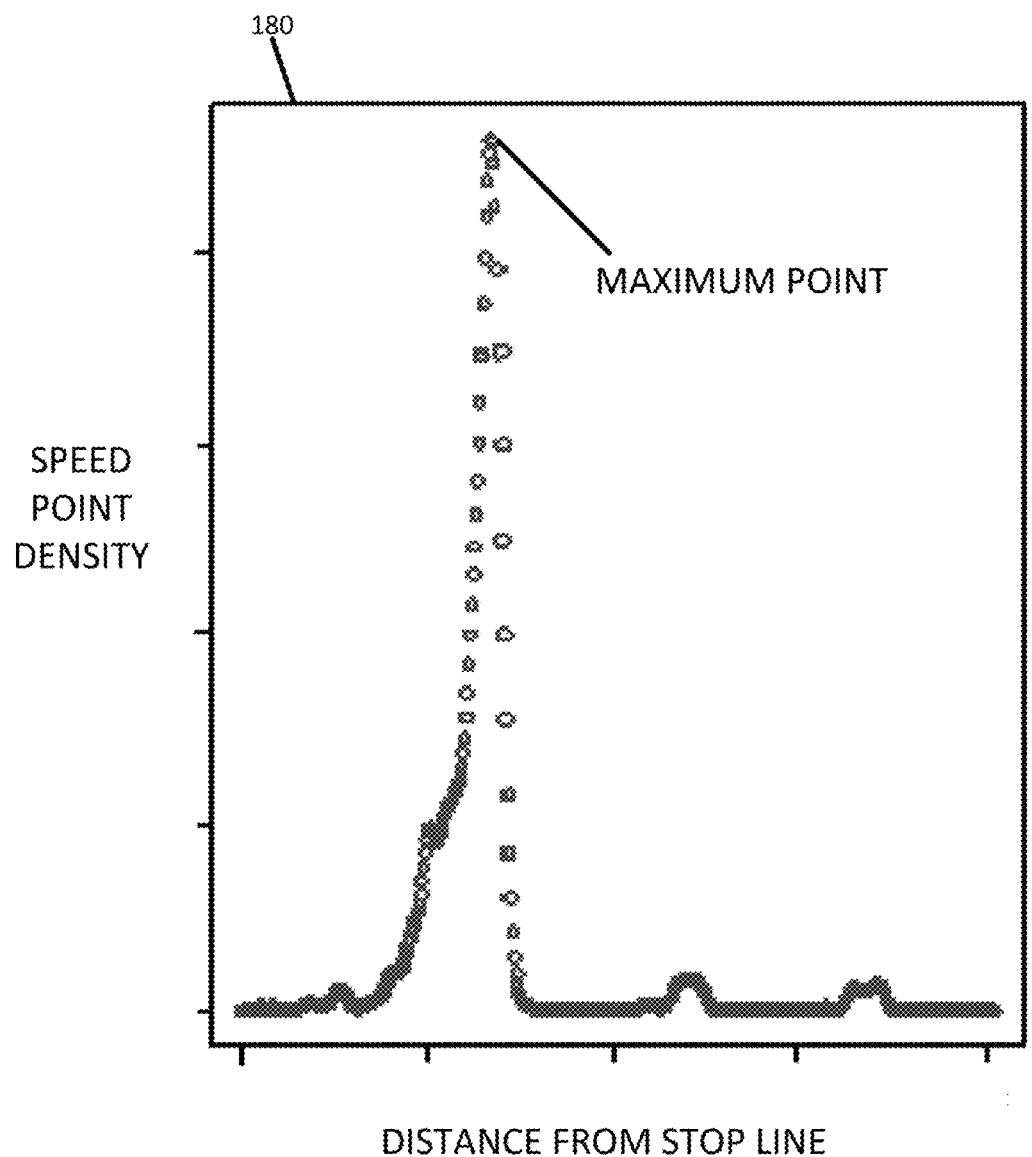
FIG. 12 illustrates an example data for the stop line of FIG. 11.

FIGS. 11 and 12 illustrate calculation of an example stop line 172. FIG. 12 illustrates a chart 180 of data for the stop line 172. A stop line is a location close to the intersection where the approaching vehicles stop during red lights. Intuitively, there is a high density of probe points with zero speed before the stop line and a low density after it. Thus the stop line is characterized by an abrupt change of the concentration of zero-speed probe points. The following procedure may be used to locate the stop line.

First, all the probe points with zero speed from the trace data are extracted, as shown in FIG. 12. Next, the density distribution of zero-speed probe points is computed, the maximum point from the density distribution curve shown in FIG. 12 is located. Techniques are described above for locating the maximum value. The location of this point is an estimated location of the stop line 172.

Various applications may be improved by the addition of accurate automatically determine TLD values. A map or geographic database is improved because the number of turning lanes and location of the turning lanes allows drivers to anticipate maneuvers. In addition, the routes derived from these databases may be more precise. For example, the route may include a routing instruct stating, "proceed left to the second turning lane" or "begin entering the turning lane in 100 meters" or "proceed to the next turning lane." Driving assistance may also be provided based on the TLD values, which is discussed in more detail below.

Figure 13:
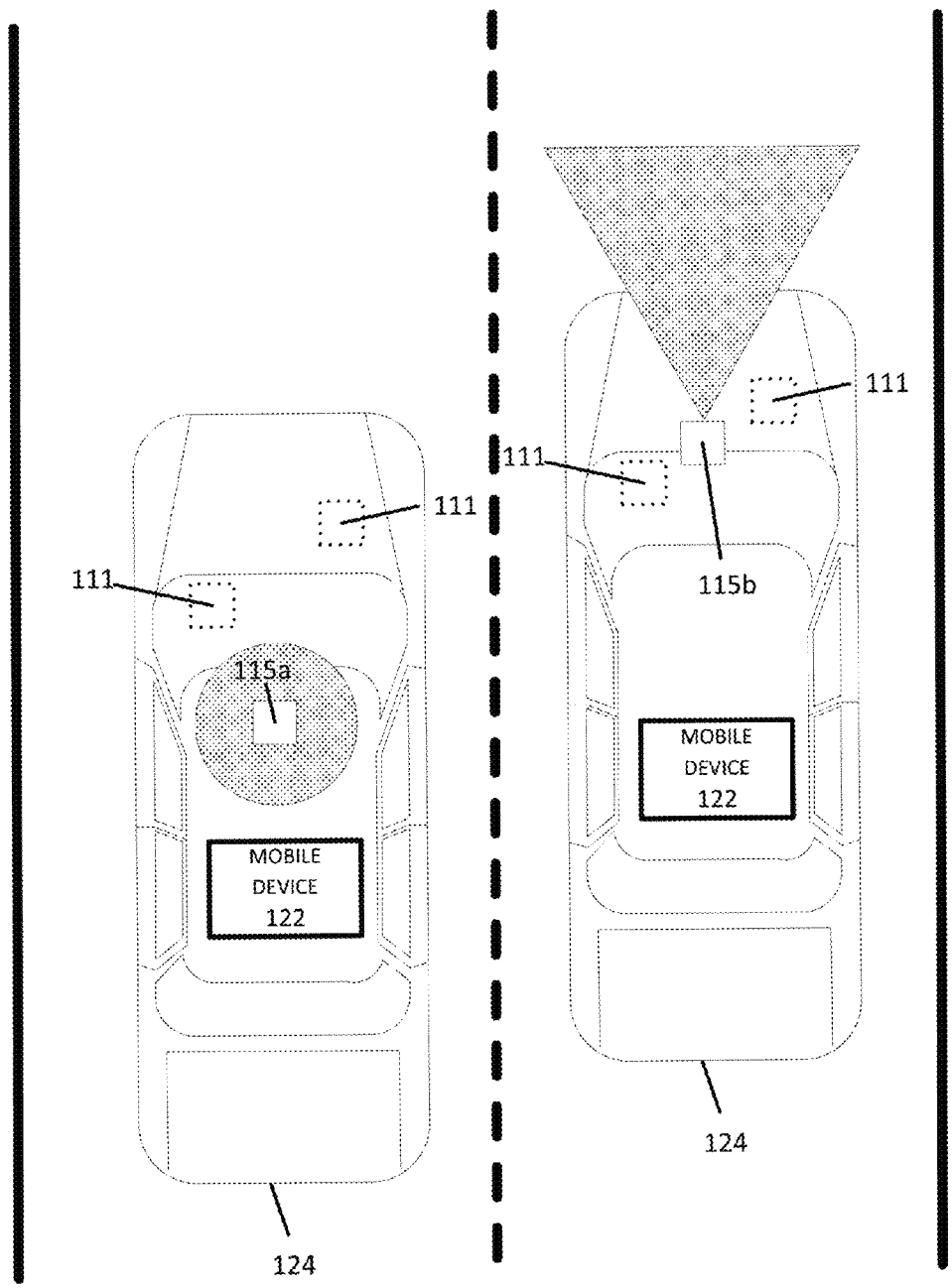
FIG. 13 illustrates an example vehicle for collecting probe data or for assisted driving.

FIG. 13 illustrates example vehicles that may be used for collecting probe data or may be used as assisted driving vehicles. An array of sensors 111 may include any combination of a brake sensor, a steering sensor, an environment sensor, a vehicle sensor, an optical sensor, and an inertial sensor. Additional, different, or fewer sensors may be used. The brake sensor may be a brake pedal sensor that detects displacement of the brake pedal of the vehicle. The brake sensor may detect the actuation of the brake pads near the wheel of the vehicle. The brake sensor may be a circuit that detects operation of the brakes through an anti-lock brake system. The steering sensor may be a steering wheel sensor that detects movement of the steering wheel of the vehicle. The steering sensor 73 may detect the angle of the steering wheel. The steering sensor may detect the angle of the front wheel of the vehicle. The environment sensor may detect the environment of the vehicle. The environment sensor may include a weather sensor such as a thermometer, barometer, or a rain sensor. The rain sensor may detect the movement of windshield wipers. The vehicle sensor may detect an operation of the vehicle. The vehicle sensor may include a throttle sensor that measures a position of a throttle of the engine or a position of an accelerator pedal, a speedometer sensor, or a tachometer sensor. The vehicle sensor may detect a malfunction of the vehicle. For example, the vehicle sensor may be a tire pressure sensor. The optical sensor may include a camera, a LiDAR device, a proximity sensor, or another sensor configured to detect distances to nearby objects or when a nearby object exists. The optical sensor may send a signal that reflects off another object and is detected by the optical sensor. The inertial sensor may include an inertial measurement unit (IMU) including one or more of an accelerometer, a gyroscope, and a magnetic sensor. The inertial sensor may generate data indicative of the acceleration, deceleration, rotational acceleration, and rotation deceleration experienced by the vehicle.

The vehicles 124 may be assisted driving vehicles. Assisted driving vehicles include autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the turn lane data.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the turn lane data.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue controls for these feature in response to the turn lane data.

The vehicles 124 may be equipped with a mobile device 122 and a sensor array 111 including one or a combination of the sensors described with respect to FIG. 4. The sensors may include a camera. One example camera 115a is mounted on the top of the vehicle and has a 360 degree field of view, and another type of camera 115b is mounted on a front, rear, or side of the vehicle 124 and has a wide angle view less than a 360 field of view. Cameras may be omitted.

The mobile device 122 or server 125 may be configured to analyze the images or video collected by a camera. The images may be processed using computer vision to identify one or more nearby objects. Example image processing techniques include vector classification, edge detection, and feature extraction. In one example, the camera captures images of the road surface in front of the vehicle, and the mobile device 122 or the server 125 may determine when any foreign object is present on the road surface or another vehicle is close to the vehicle 124.

The mobile device 122 may be a personal device such as a mobile phone equipped with position circuitry (e.g., global positioning system (GPS)) and an inertial measurement unit (IMU). The mobile device 122 may be a specialized device (e.g., not a mobile phone) mounted or otherwise associated with the vehicle 124 and similarly equipped with position circuitry and an IMU. Additional, different, or fewer components may be included.

Figure 14:
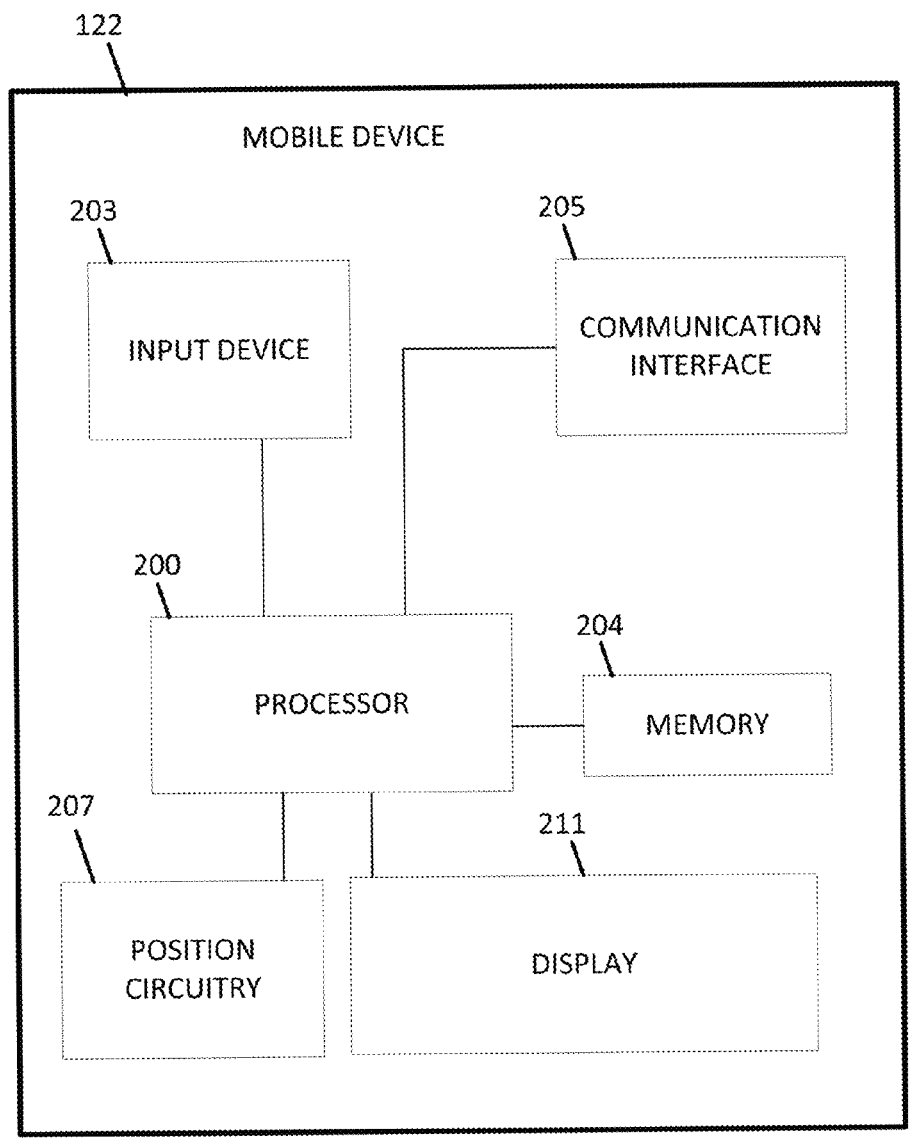
FIG. 14 illustrates an example mobile device for the system of FIG. 1.
Figure 15:
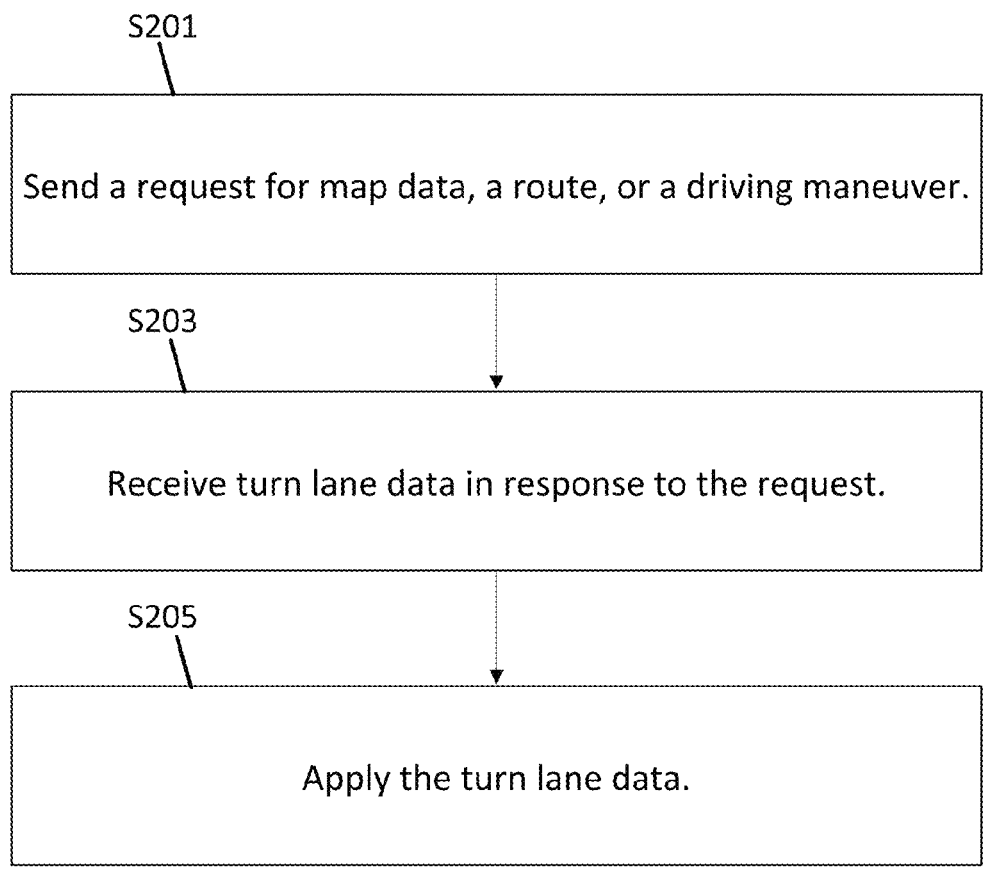
FIG. 15 illustrates an example flowchart for operation of the mobile device of FIG. 14.

FIG. 14 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device/personal computer 122. FIG. 15 illustrates an example flowchart for operation of the mobile device of FIG. 14. The acts of FIG. 14 may be performed by the mobile device 122, an advanced driving assistance system (ADAS), a HAD device or an autonomous vehicle, any of which may be referred to as an assisted driving system. The acts may be applied in a different order. Acts may be omitted or repeated. Additional acts may be added.

At act S201, the processor 200 sends a request for a route, map data, or a driving maneuver. The request for a route may be based on a destination location entered by through the input device 203 and an origin destination either entered by the input device 203 or determined as a current location of the mobile device by the position circuitry 207. The request for map data may similar be based on a geographic region around the current location or an entered location. The driving maneuver may also be based on a destination that the assisted driving system is providing driving commands to reach.

At act S203, the processor 200 or communication interface 205 receives turn lane data in response to the request. The turn lane data may describe the location of turn lanes such as the beginning of the turn lane, the average entry point of the turn lane, and the ending of the turn lane. The turn lane data may describe a quantity of turn lanes.

At act S205, the processor 200 may apply the turn lane data. For example, the processor 200 may instruct the display 211 to present a map include the turn lane data such as the location of the turn lane(s) or the number of turn lanes.

The processor 200 may generate a message regarding the turn lane. For example, the display 211 may present a message when the turn lane begins or warn of an approaching turn lane. The display 211 may present a message that describes the number of turn lanes at the intersection and the destination road correspond to each of the turn lanes. The processor 200 may apply the turn lane data by generating a driving command. The driving command may be a steering command to steer the vehicle 124 into a turn lane based on the location of the turn lane in the turn lane data. The driving command may be a turn signal based on the location of an upcoming turn lane. The driving command may be a braking signal to slow down for the turn lane.

Figure 16:
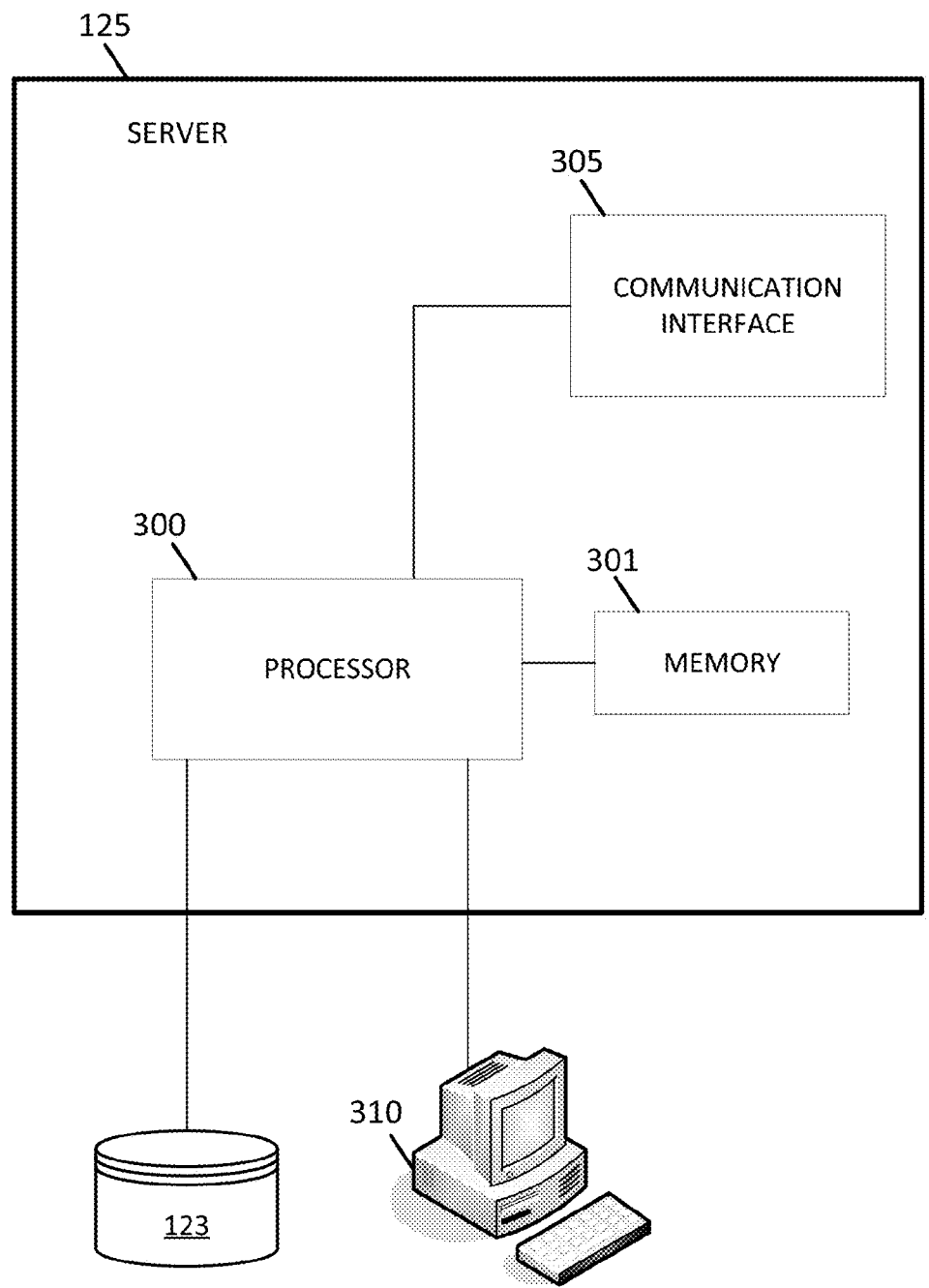
FIG. 16 illustrates an example server of the system of FIG. 1.

FIG. 16 illustrates an example network device (e.g., server 125) of the system of FIG. 1. The server 125 includes a processor 300, a communication interface 305, and a memory 301. The server 125 may be coupled to a database 123 and a workstation 128. The workstation 128 may be used as an input device for the server 125 for entering values for the thresholds and predetermined distances for calculating the turn lane data. In addition, the communication interface 305 is an input device for the server 125. In certain embodiments, the communication interface 305 may receive data indicative of user inputs made via the workstation 128 or the mobile device 122.

The road link data records of the database 123 may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The node data records may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The workstation 128 may be a general purpose computer including programming specialized for providing input to the server 125. For example, the workstation 128 may provide settings for the server 125. The settings may include the bounding rectangle, distance thresholds, distance for defining the start line, the window and increment size for the moving average window, or statistic thresholds described above for the calculation of the turn lane data. The workstation 128 may include at least a memory, a processor, and a communication interface.

The bounding rectangle for the intersection may be defined based the functional class of the associated road segment for the turning lane. The functional class of the road segment may be described as a numerical value (e.g., 1, 2, 3, 4, and 5). Functional class 1 may be highways while functional class 5 may be small streets.

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The mobile device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
identifying probe data for an intersection, wherein the probe data includes locations and headings from a positioning device;
dividing the probe data for the intersection into at least one turn trace and at least one through trace based on the locations in the probe data;
calculating heading change data as a difference between the headings of the turn trace and the headings of the through trace;
calculating at least two local extrema of the heading change data;

calculating a number of turning lanes for the at least one turn trace for the intersection based on the at least two local extrema; and generating a driving command for a navigation device in response to the calculated number of turning lanes for the intersection based on the at least two local extrema.

2. The method of claim 1, further comprising:

identifying a stop line and a start line based on the probe data, wherein the stop line and start line define boundaries of the intersection.

3. The method of claim 2, further comprising:

removing a portion of the probe data downstream of the stop line; and removing a portion of the probe data upstream of the start line.

4. The method of claim 1, further comprising:

calculating an average of the heading of the at least one through trace;

calculating a standard deviation of the heading of the at least one through trace; and filtering the probe data of the at least one through trace based on the average of the heading and the standard deviation of the heading.

5. The method of claim 4, further comprising:

defining a moving window for the at least one through trace, wherein filtering the probe data is based on the moving window.

6. The method of claim 1, further comprising:

calculating an average of the heading of the at least one turn trace;

calculating a standard deviation of the heading of the at least one turn trace; and filtering the probe data of the at least one turn trace based on the average of the heading and the standard deviation of the heading.

7. The method of claim 6, further comprising:

defining a moving window for the at least one turn trace, wherein filtering the probe data is based on the moving window.

8. The method of claim 1, further comprising:

smoothing the heading change data with a filter.

9. The method of claim 1, wherein identifying at least two local extrema of the heading change data, comprises:

calculating a derivative of the heading change data.

10. The method of claim 1, further comprising:

calculating a minimum of the heading change data, wherein the minimum of the heading change data indicates a beginning of a turning lane.

11. The method of claim 10, wherein the at least two local extrema include local maxima, the method further comprising:

calculating a largest distance between combinations of the at least two local maxima; and designating the two maxima of the largest distance as a transition from a normal lane to the turning lane.

12. The method of claim 11, further comprising:

sending the two maxima of the largest distance and a standard deviation of the heading data to a classification system; and receiving the number of turning lanes from the classification system.

13. The method of claim 1, wherein providing data indicative of the number of turning lanes for the intersection to the external device comprises:

providing the number of turning lanes to a geographic database.

14. The method of claim 1, wherein providing data indicative of the number of turning lanes for the intersection to the external device comprises:

providing the driving command based on the number of turning lanes.

15. An apparatus comprising:

at least one processor; and at least one memory including computer program code for one or more programs, the at least one memory and the computer program code configured to, with the at least one processor, cause the apparatus to at least:

identify probe data for an intersection, wherein the probe data includes location values and heading values;

calculate heading change data based on differences in heading values in the probe data for at least one turn trace and at least one through trace;

calculate at least two local maxima of the heading change data;

determine a plurality of characteristics for the at least one turn trace based on the at least two local maxima; and generate a driving assistance command for a navigation device in response to the characteristic of the turn lane for the intersection based on the at least two local maxima.

16. The apparatus of claim 15, the at least one memory and the computer program code configured to, with the at least one processor, cause the apparatus to at least:

identify link geometry for the intersection; and calculate the heading change data as a difference between the heading values in the probe data and heading values derived from the link geometry.

17. The apparatus of claim 15, the at least one memory and the computer program code configured to, with the at least one processor, cause the apparatus to at least:

calculate an average of the heading values;

calculate a standard deviation of the heading values; and filter the probe data based on a moving window defined by the average and the standard deviation.

18. The apparatus of claim 15, the at least one memory and the computer program code configured to, with the at least one processor, cause the apparatus to at least:

calculate a minimum of the heading change data, wherein the minimum of the heading change data indicates a beginning of a turning lane.

19. The apparatus of claim 15, the at least one memory and the computer program code configured to, with the at least one processor, cause the apparatus to at least:

calculating a largest distance between combinations of the at least two local maxima; and designating the two maxima of the largest distance as a transition from a normal lane to the turning lane.

20. A non-transitory computer readable medium including instructions that when executed are operable to:

identifying probe data for an intersection, wherein the probe data includes locations and headings;

dividing the probe data for the intersection into a first trace and a second trace based on the locations in the probe data;

calculating heading change data as a difference between the headings of the first trace and the headings of the second trace;

identifying at least two local extrema points of the heading change data;

determining a plurality of turning lanes for the at least one first trace based on the at least two local extrema points; and generating a driving command for a navigation device based on the intersection based on the at least two local extrema points.

21. The method of claim 1, wherein the at least two local extrema include two local maxima points, two local minima points, or one local maximum point and one local minimum point.

22. The method of claim 21, wherein the heading change data are ordered in time, and wherein the two local maxima points or the one local maximum point is larger than a preceding point and a subsequent point in the heading change data ordered in time, or wherein the two local minima points or the one local minimum point is smaller than a preceding point and a subsequent point in the heading change data ordered in time.

* * * * *